US008308433B2

(12) United States Patent
Loganathan et al.

(10) Patent No.: US 8,308,433 B2
(45) Date of Patent: Nov. 13, 2012

(54) SYSTEM AND METHOD FOR CONTROLLING WIND TURBINE BLADES

(75) Inventors: Jaikumar Loganathan, Bangalore (IN); Subhrajit Dey, Bangalore (IN); Klaus Ulrich Koegler, Rheine (DE); Manisekaran Santhanakrishnan, Tiruvallur (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/894,453

(22) Filed: Sep. 30, 2010

(65) Prior Publication Data

US 2011/0268570 A1 Nov. 3, 2011

(51) Int. Cl.
*F03D 7/02* (2006.01)

(52) U.S. Cl. ........................................................ 416/61

(58) Field of Classification Search ........................ None
See application file for complete search history.

(56) References Cited

U.S. PATENT DOCUMENTS

| | | | | |
|---|---|---|---|---|
| 3,968,466 | A | 7/1976 | Nakamura et al. | |
| 4,082,001 | A * | 4/1978 | Long et al. | 416/61 |
| 7,445,431 | B2 | 11/2008 | Larsen et al. | |
| 7,632,068 | B2 | 12/2009 | Bak et al. | |
| 2006/0145483 | A1 | 7/2006 | Larsen et al. | |
| 2008/0223141 | A1 | 9/2008 | Schmid et al. | |
| 2008/0317598 | A1 | 12/2008 | Barbu et al. | |
| 2009/0311097 | A1 | 12/2009 | Pierce et al. | |
| 2010/0054916 | A1 | 3/2010 | Zheng et al. | |
| 2010/0074748 | A1 | 3/2010 | Godsk et al. | |
| 2010/0101328 | A1 | 4/2010 | Enevoldsen et al. | |

FOREIGN PATENT DOCUMENTS

EP 2180183 A1 * 4/2010

OTHER PUBLICATIONS

Search Report and Written Opinion from corresponding EP Application No. 11181469.5-1236 dated Mar. 19, 2012.

* cited by examiner

*Primary Examiner* — Richard Edgar
(74) *Attorney, Agent, or Firm* — Ann M. Agosti

(57) ABSTRACT

A wind turbine system is presented. The wind turbine system includes a blade comprising an airfoil and a sensing device disposed on a surface of the airfoil, wherein the sensing device generates signals that are representative of pressure deflection on the surface of the airfoil. The wind turbine system further comprises a processing subsystem that receives location details of the sensing device and a transfer function corresponding to the airfoil, determines a location of a stagnation point on the surface of the airfoil based upon the signals and the location details, and determine an angle of attack (AOA) on the surface of the airfoil based upon the location of the stagnation point and the transfer function.

16 Claims, 4 Drawing Sheets

SYSTEM AND METHOD FOR CONTROLLING WIND TURBINE BLADES

BACKGROUND

This invention relates generally to the field of wind turbines, and more specifically to methods and systems for measuring an angle of attack.

Wind turbines are increasingly gaining importance in the area of renewable sources of energy generation. In recent times, wind turbine technology has typically been applied to large-scale power generation applications. Maximizing performance while minimizing loads of the wind turbines in varied wind conditions is one of the many challenges that exist in harnessing wind energy. The performance of the wind turbines, for example, may be maximized by maximizing aerodynamic efficiency and energy output, minimizing loads and noise, and combinations thereof.

Typically, the performance of the wind turbines reduces due to variations in the operating conditions of the wind turbines. The operating conditions, for example, may include a direction of wind, a velocity of wind, an angle of attack (AOA), or the like. The variations in operating conditions may increase fatigue loads, and deteriorate performance of the wind turbines. For example, a variation in the direction of wind may decrease an angle of attack of a blade that may reduce the performance of the blade. Therefore, information about the operating conditions of the wind turbine may be useful in improving the performance of the wind turbine.

Generally, the variations in operating conditions of wind turbines are measured using pressure detectors, such as, a pitot static tube or prandtl tube, a piezo/strain based pressure sensor, or the like. Installations of such pressure detectors typically require sizable ducts or penetrations in blades of the wind turbines. Furthermore, such pressure detectors typically have high tendency to interfere with the flow of fluid and require complex calibrating mechanisms to measure pressure. Additionally, such pressure detectors may be sensitive to external parameters, such as, dust accumulation, rain, and so forth.

In view of the foregoing, it would be beneficial and advantageous to provide a system and method for real-time measurements of the operating conditions. More particularly, it will be beneficial to measure an angle of attack of a blade in real-time. Furthermore, it would be advantageous to enhance the performance of wind turbines based upon the angles of attacks.

BRIEF DESCRIPTION

Briefly in accordance with one aspect of the technique, a wind turbine system is presented. The system includes a blade that includes an airfoil. The system further includes a sensing device disposed on a surface of the airfoil, wherein the sensing device generates signals that are representative of pressure deflection on the surface of the airfoil, a processing subsystem that includes location details of the sensing device and a transfer function corresponding to the airfoil. The processing subsystem receives location details of the sensing device and a transfer function corresponding to the airfoil, determines a location of a stagnation point on the surface of the airfoil based upon the signals, and determines an angle of attack (AOA) on the surface of the airfoil based upon the location of the stagnation point and the transfer function.

In accordance with another aspect, a wind turbine system is presented. The wind turbine system includes a plurality of blades, wherein each of the plurality of blades includes a plurality of airfoils, a sensing device disposed on each of the plurality of airfoils, wherein the sensing device generates signals that are representative of pressure deflection on a corresponding surface of each of the plurality of airfoils and a processing subsystem. The processing subsystem receives location details of the sensing device and a transfer function corresponding to each of the plurality of airfoils, determines a location of a stagnation point on the surface of each of the plurality of airfoils based upon the signals and the location details, and determines an angle of attack (AOA) on the surface of each of the plurality of airfoils based upon the stagnation point and the transfer function.

In accordance with one more aspect of the present technique, a method for determining an angle of attack (AOA) on a surface of an airfoil is presented. The method includes steps of generating signals that are representative of pressure deflection on the surface of the airfoil, storing location details of the sensing device and a transfer function corresponding to a sensing device, determining a location of a stagnation point on the surface of the airfoil based upon the signals and the location details, and determining an angle of attack (AOA) on the surface of the airfoil based upon the location of the stagnation point and the transfer function.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present system and techniques determine an angle of attack on a surface of an airfoil in real-time. As used herein, the term "airfoil" may be used to refer to a shape that is defined by a cross-section of a blade. Additionally, the term "angle of attack" may be used herein to refer to an angle between a chord line of an airfoil and a resultant vector that represents a relative motion between the airfoil and surrounding fluid. In one embodiment, the fluid may be wind or air.

Figure 1:
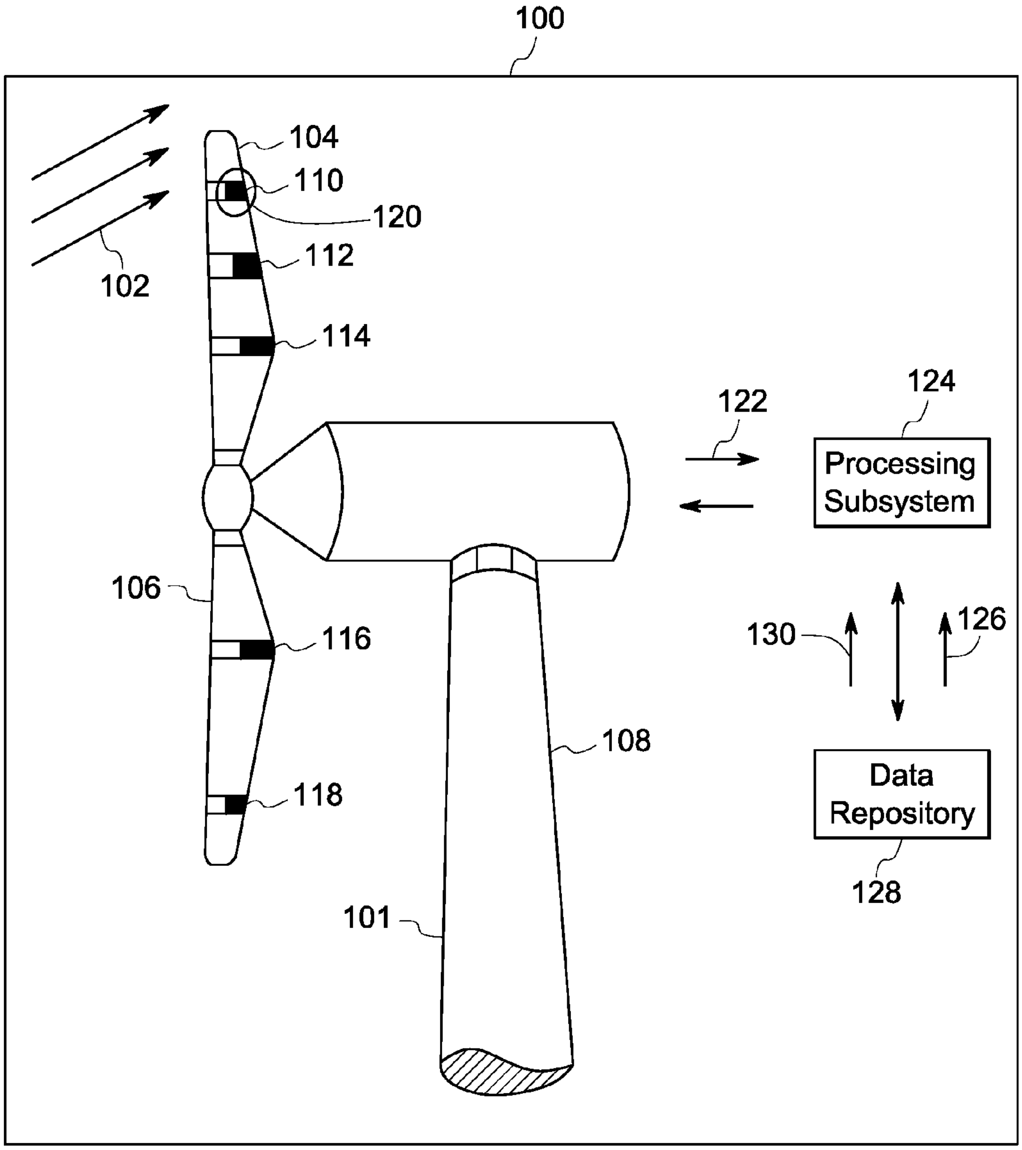
FIG. 1 is a diagrammatic illustration of an exemplary wind turbine system, in accordance with an embodiment of the present system.

Referring now to FIG. 1, a diagrammatic illustration of an exemplary wind turbine system 100, in accordance with embodiments of the invention, is depicted. The wind turbine system 100 determines angles of attack (AOAs) on surfaces of a plurality of blades 104, 106 in a wind turbine 101. In certain embodiments, the wind turbine system 100 controls the wind turbine 101 based upon the AOAs. As used herein, the term "wind turbine" may be used to refer to a rotating machine that converts kinetic energy of wind to mechanical energy. The mechanical energy may then be converted to electrical energy.

As shown in FIG. 1, the wind turbine system 100 includes the wind turbine 101 that is acted upon by a wind flow 102. In an exemplary embodiment, the wind turbine 101 includes the rotor blades 104, 106 and a tower 108. In a presently contemplated configuration, the rotor blade 104 includes sensing devices 110, 112, 114, and the rotor blade 106 includes sensing devices 116, 118. In one embodiment, each of the sensing devices 110, 112, 114, 116, 118 senses a pressure deflection at a corresponding location and on the surface of the respective rotor blades 104, 106. For example, as shown in FIG. 1, the sensing device 110 determines a pressure deflection at a corresponding location 120 on the surface of the rotor blade 104. As used herein, the term "pressure deflection" may be used to refer to a deflection of a primary element or a membrane of a sensing device from an original position of the primary element or the membrane. For example, in a membrane based sensing device, a deflection of a membrane of the sensing device from an original position of the membrane due to pressure is used herein to refer to pressure deflection.

Furthermore, each of the sensing devices 110, 112, 114, 116, 118 generates signals 122 that are representative of the pressure deflection at the corresponding location and on the surface of the rotor blades 104, 106. The sensing devices 110, 112, 114, 116, 118, for example, may be a capacitance based membrane pressure strip, a resistance based membrane pressure strip, a resistance sensor, a capacitance sensor, or combinations thereof. In certain embodiments, a thickness of each of the sensing devices is less than 6 millimeters. It may be noted that, while in the presently contemplated configuration, the rotor blade 104 is shown as including three sensing devices 110, 112, 114, and the rotor blade 106 is shown as including two sensing devices 116, 118, in certain embodiments, a number of sensing devices and locations of the sensing devices on the surface of the rotor blades 104, 106 in the wind turbine 101 may vary. The sensing devices 110, 112, 114, 116, 118 may be disposed on the blades 104, 106 in a predetermined pattern. Exemplary embodiments of locations of the sensing devices 110, 112, 114, 116, 118 on the surfaces of the blades 104, 106 will be explained in greater detail with reference to FIG. 3.

As shown in the presently contemplated configuration, a processing subsystem 124 is operationally coupled to the sensing devices 110, 112, 114, 116, 118. The processing subsystem 124 receives the signals 122 from the sensing devices 110, 112, 114, 116, 118. Subsequent to the receipt of the signals 122, the processing subsystem 124 determines locations of stagnation points on the surfaces of the rotor blades 104, 106. The processing subsystem 124 determines the locations of stagnation points by processing the received signals 122 and location details 126 of the sensing devices 110, 112, 114, 116, 118. As used herein, the term "location of a stagnation point" may be used to refer to a location on a surface of an airfoil of a blade that has a maximum pressure deflection. Additionally, as used herein, the term "location details" may be used to refer to information about a position or location of a sensing device on a surface of a blade. For example, the location details may include coordinates of geometric coordinate system, wherein the coordinates may be used to determine the locations of the sensing devices 110, 112, 114, 116, 118 on the blades 104, 106. The processing subsystem 124 may receive the location details 126 from a data repository 128. As shown in the presently contemplated configuration, the processing subsystem 124 may be operationally coupled to the data repository 128. The determination of the locations of the stagnation points based upon the received signals 122 will be explained in greater detail with reference to FIG. 2.

With continuing reference to FIG. 1, the processing subsystem 124 determines the angles of attack (AOAs) on the surfaces of the blades 104, 106 based upon the locations of the stagnation points and a transfer function 130. As used herein, the term "transfer function" is used to refer to a function of a location of a stagnation point on an airfoil of a blade wherein the function may be used to determine an angle of attack (AOA) on the surface of the airfoil. The processing subsystem 124, for example, may retrieve the transfer function 130 from the data repository 128. An exemplary transfer function 130 may be represented by the following equation (1):

$$\alpha = m_n S_{Stag}^{\ n} + m_{n-1} S_{Stag}^{\ n-1} + m_{n-2} S_{Stag}^{\ n-2} + \ldots + m_1 S_{Stag} + m_0 \tag{1}$$

wherein $\alpha$ is an angle of attack (AOA), $m_n$, $m_{n-1}$, $m_{n-2}$, . . . $m_2$, $m_1$ and $m_0$ are coefficients, and $S_{Stag}$ is a location of a stagnation point and n is the order of the polynomial. In one embodiment, the values of the coefficients $m_n$, $m_{n-1}$, $m_{n-2}$, . . . $m_2$, $m_1$ and $m_0$ are dependent upon a shape of each of the blades 104, 106, a profile or shape of an airfoil, a location of a sensing device, a blade pitch angle, a prebend, a coning angle or the like. The values of the coefficients $m_n$, $m_{n-1}$, $m_{n-2}$, . . . $m_2$, $m_1$ and $m_0$ may be determined using one or more of the techniques including a wind tunnel test, computational fluid dynamics (CFD), simulations and panel methods based techniques, or the like. The coefficients $m_n$, $m_{n-1}$, $m_{n-2}$, . . . $m_2$, $m_1$ and $m_0$ may be retrieved from the data repository 128 (see FIG. 1).

Subsequent to the determination of the AOAs, the processing subsystem 124 may control the blades 104, 106 based upon the AOAs to enhance performance of the blades 104, 106. For example, the processing subsystem 124 may alter a pitch angle of each of the blades 104, 106 based upon the AOAs to reach optimized AOAs. As used herein, the term "pitch angle" may be used to refer to an angle between a chord line of a blade and a plane of rotation of a wind turbine that includes the blade. As used herein, the term "optimized AOA" may be used to refer to an AOA that allows a wind turbine to operate at maximum efficiency in predetermined wind conditions. In certain embodiments, the processing subsystem 124 may optimize the aerodynamics of the blades 104, 106 based upon the AOAs.

Figure 2:
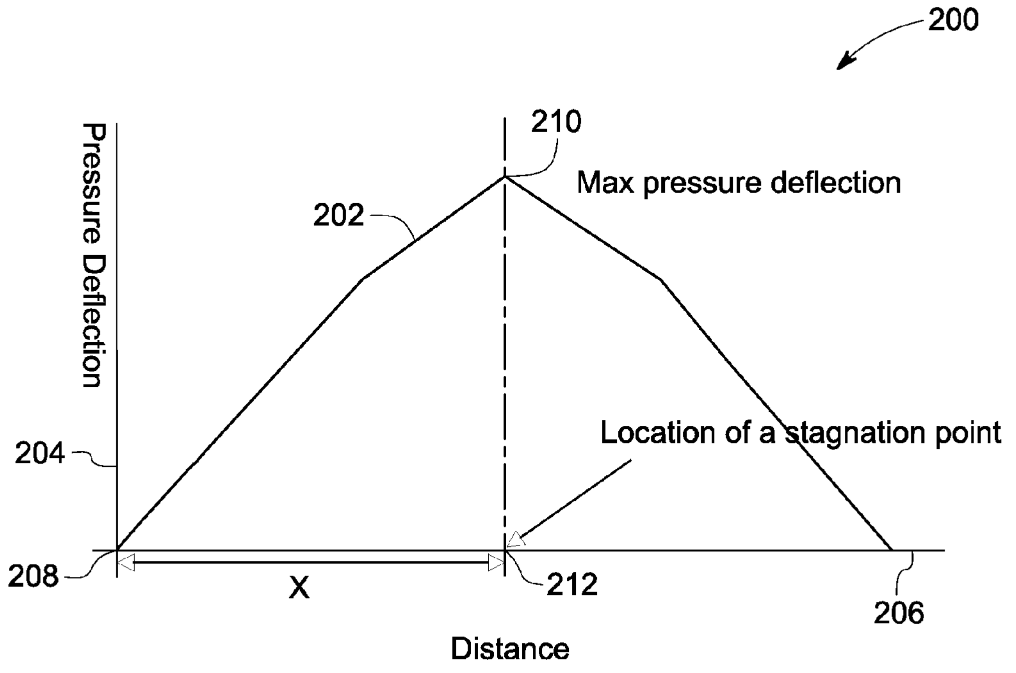
FIG. 2 is an exemplary graphical representation illustrating a profile of an exemplary signal generated by a sensing device of FIG. 1; in accordance with an embodiment of the present system.

FIG. 2 is an exemplary graphical representation 200 illustrating a profile 202 of an exemplary signal 122 generated by the sensing device 110 of FIG. 1. As shown in FIG. 2, Y-axis 204 of the graph 200 represents pressure deflection at the location 120 of the sensing device 110 and on the surface of the blade 104 (see FIG. 1). Additionally, X-axis 206 of the graph 200 represents a distance of a location of pressure deflection from a predetermined reference point 208 on the blade 104. Accordingly, the profile 202 represents pressure deflections at various distances on the surface of the blade 104 from the predetermined reference point 208. As used herein, the term "reference point" is used to refer to a location on a surface of a blade that may be used as a reference for determining locations of pressure deflections on the surface of the blade 104. The reference point 208, for example, may be predetermined by a manufacturer of a wind turbine or by a user. As shown in FIG. 2, the profile 202 shows a maximum pressure deflection 210 at a distance X from the reference point 208. Accordingly, the distance X of the maximum pressure deflection 210 from the reference location 208 may be affirmed as a location of a stagnation point 212 corresponding to the sensing device 110.

Figure 3:
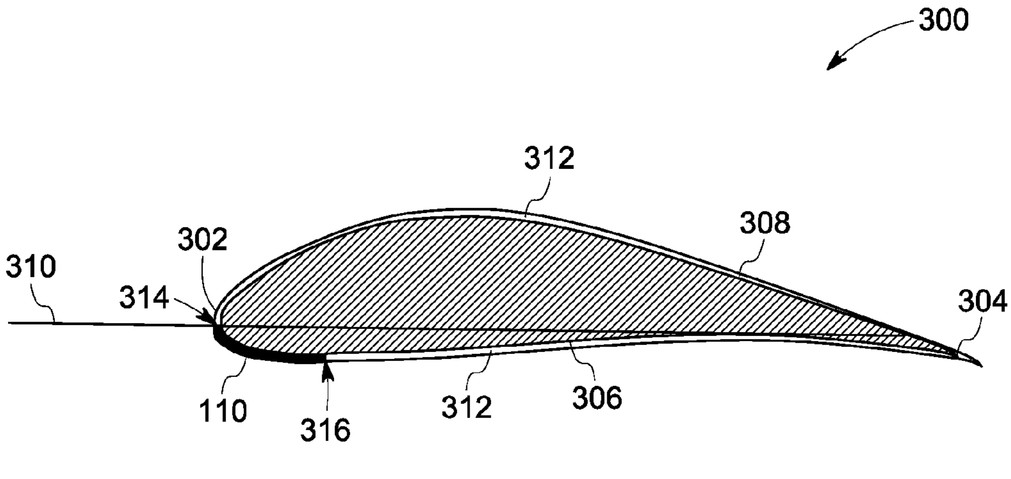
FIG. 3 shows an airfoil of a blade to illustrate an exemplary positioning of a sensing device of FIG. 1, in accordance with an embodiment of the present techniques.

FIG. 3 shows a cross-sectional view 300 of the blade 104 to illustrate an exemplary positioning of the sensing device 110 of FIG. 1, in accordance with an embodiment of the present techniques. Hereinafter, the terms "cross-sectional view" and "airfoil" will be used interchangeably. As shown in FIG. 1, the airfoil 300 includes a leading edge 302, a trailing edge 304, a pressure side 306, a suction side 308 and a chord 310. In one embodiment, the sensing device 110 may be disposed on the pressure side 306 of the airfoil 300. In another embodiment, the sensing device 110 may be disposed on the pressure side 306 that extends from the leading edge 302 towards the trailing edge 304 along a predetermined length of the chord 310. The predetermined length may be at least 30% of the length of the chord 310. In still another embodiment, a predefined length of the sensing device 110 may be disposed on the pressure side 306 and rest of the length of the sensing device 110 may be disposed on the suction side 308 such that the sensing device 110 extends from the leading edge 302 towards the trailing edge 304. For example, the predefined length of the sensing device 110 that is disposed on the pressure side 306 may be about 80% of a length of the sensing device 110. Accordingly, the rest of the length of the sensing device 110 that is disposed on the suction side 308 may be about 20% of the length of the sensing device 110. In certain embodiments, a thickness of the sensing device 110 may be less than 6 millimeters. While the presently contemplated configuration shows positioning of the sensing device 110 on the airfoil 300 of the blade 104, it may be noted that the various positions of the sensing device 110 discussed with reference to FIG. 3 may be used for positioning any of the sensing devices 112, 114, 116, 118 (see FIG. 1).

As shown in FIG. 3, the sensing device 110 includes two ends 314, 316. It may be noted that due to a thickness of the sensing device 110, the ends 314, 316 may form rough surfaces towards the ends 314, 316 on the airfoil 300. The formation of the rough surface may deteriorate the aerodynamic performance of the airfoil 300. Accordingly, in accordance with one embodiment, the airfoil 300 may include a sleeve 312 to form a uniform surface on the airfoil 300. In one embodiment, the sleeve 312 extends from the end 314 to another end 316 and does not overlap the sensing device 110. In one embodiment, the sleeve 312 has a thickness similar to the thickness of the sensing device 110.

Figure 4:
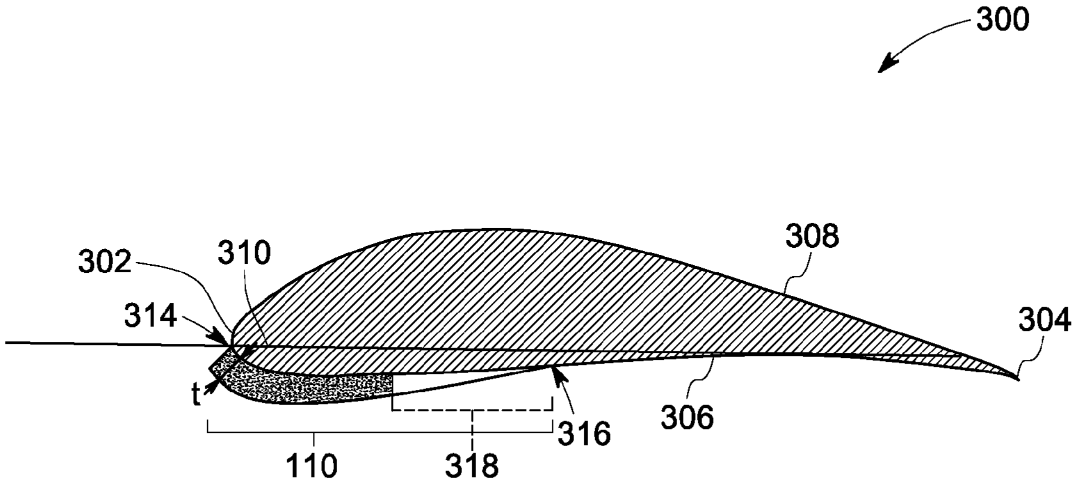
FIG. 4 shows an airfoil of a blade to illustrate an exemplary sensing device of FIG. 1 that is tapered towards one or both ends, in accordance with an embodiment of the present techniques.

FIG. 4 shows the airfoil 300 of the blade 104 to illustrate the exemplary sensing device 110 of FIG. 1 that is tapered towards one or both of the ends 314, 316, in accordance with one embodiment of the present techniques. As shown in the presently contemplated configuration, the sensing device 110 has a thickness $t_1$. Due to the thickness $t_1$ of the sensing device 110, a rough surface may be formed towards the ends 314, 316 on the airfoil 300. As previously noted with reference to FIG. 3, the formation of rough surface may deteriorate aerodynamic performance of the airfoil 300. Accordingly, as shown in the presently contemplated configuration, the end 316 of the sensing device 110 is tapered. As shown in FIG. 4 reference numeral 318 represents tapered portion towards the end 316 of the sensing device 110. The end 316 of the sensing device 110 is tapered such that the thickness $t_1$ of the sensing device 110 gradually decreases towards the end 316. The tapering of the sensing device 110 towards the end 316 forms a smooth surface on the airfoil 300. The formation of a smooth surface towards the ends of the sensing device 110 on the airfoil 300 may prevent deterioration of the aerodynamic performance of the airfoil 300. While in the presently contemplated configuration, the end 316 is shown as being tapered, it may be noted that both the ends 314, 316 of the sensing device 110 may be tapered.

Figure 5:
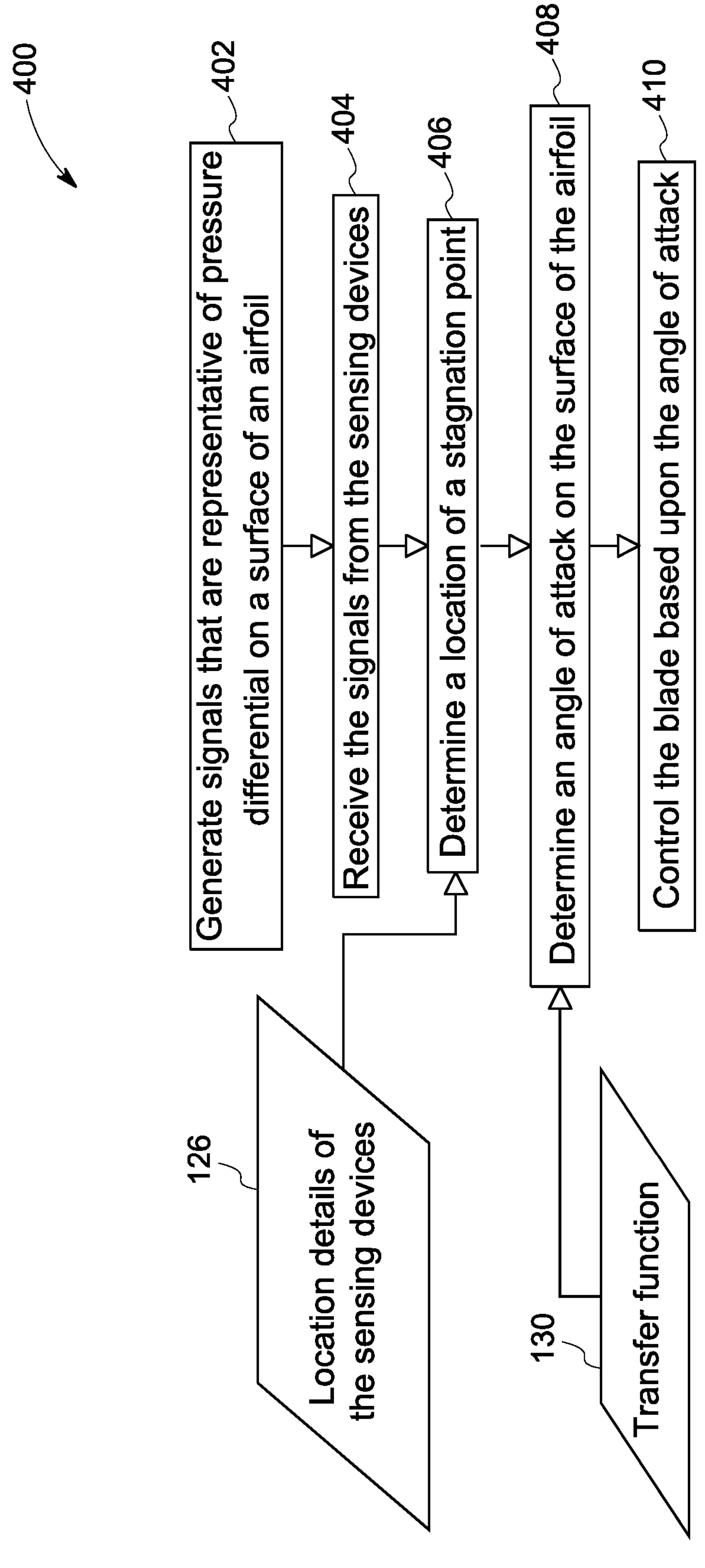
FIG. 5 is a flow chart representing exemplary steps in a method for determining an angle of attack (AOA) on a surface of the airfoil of FIG. 3 in accordance with an embodiment of the present techniques.

FIG. 5 is a flow chart 400 representing steps in a method for determining an angle of attack (AOA) on the surface of the airfoil 300 of FIG. 3. As previously noted with reference to FIG. 3, the airfoil 300 is a cross-sectional view of the blade 104 (see FIG. 1). The method starts at step 402 where signals that are representative of pressure deflection on the surface of the airfoil 300 are generated. The signals, for example, may be generated by the sensing devices 110, 112, 114, 116, 118 (see FIG. 1). Additionally, the signals may include the signals 122 (see FIG. 1).

Furthermore, at step 404 the signals may be received from the sensing devices 110, 112, 114, 116, 118. The signals, for example, may be received by the processing subsystem 124 (see FIG. 1). Subsequently, a location of a stagnation point on the surface of the airfoil 300 may be determined at step 406. In one embodiment, the location of the stagnation point may be determined by the processing subsystem 124 (see FIG. 1). The location of the stagnation point, for example, may be determined based upon the received signals and the location details 126 of the sensing devices (see FIG. 1).

Subsequently, at step 408, the AOA on the surface of the airfoil 300 may be determined The AOA, for example, may be determined by the processing subsystem 124 (see FIG. 1). The AOA may be determined based upon the location of the stagnation point and the transfer function 130 (see FIG. 1) corresponding to the airfoil 300. More particularly, the AOA may be determined by inserting the location of the stagnation point in the transfer function 130. As previously noted with reference to FIG. 1, the transfer function 130 corresponding to the airfoil may be retrieved from the data repository 128. Subsequently, at step 410, the blade 104 may be controlled based upon the AOA to enhance performance of the blade 104. The blade, for example may be controlled by altering a pitch angle of the blade 104. As used herein, the term "pitch angle" may be used to refer to an angle between a chord line of a blade and a plane of rotation of a wind turbine that includes the blade.

The systems and methods as described herein above may also be used to retrofit a wind turbine, such as the wind turbine 101 of FIG. 1 for determining an angle of attack on a surface of a blade of the wind turbine 101. More particularly, the exemplary sensing devices 110, 112, 114, 116, 118 and the processing subsystem 124 (see FIG. 1) may be retrofit to the existing infrastructure of the wind turbine 101. Furthermore, in certain embodiments, the processing subsystem 124 receives location details of the plurality of sensing devices 110, 112, 114, 116, 118 and a transfer function corresponding to the blade, determines locations of stagnation points on the surfaces of the wind turbine 101 based upon the signals and the location details, and determines angles of attack (AOAs) on the surfaces of the wind turbine 101 based upon the locations of the stagnation points and the transfer function.

The embodiments of the present system and techniques result in real-time determination of an AOA on an airfoil of a blade. Certain embodiments of the present techniques control the wind turbine based upon the angle of attack to increase the performance of the blade. The embodiments of the present system and techniques determine the AOA based upon a location of maximum pressure deflection on the surface of the airfoil. The pressure deflection is measured using one or more sensing devices. Since the sensing devices do not measure pressure, and determine locations of maximum pressure deflections, the sensing devices do not require complex calibrations. Thus, the sensing devices do not require one or more holes that are generally required for calibrating the sensing devices. Furthermore, since the sensing devices do not have holes, the efficiency of the sensing devices is not affected by weather conditions, such as, rain, dust, ice, etcetera.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A wind turbine system, comprising:
- a blade comprising an airfoil;
- a sensing device disposed on a surface of the airfoil, wherein the sensing device generates signals that are representative of pressure deflection on the surface of the airfoil;
- a processing subsystem comprising computer executable instructions configured to execute the steps of:
  - receiving location details of the sensing device and a transfer function corresponding to the airfoil;
  - determining a location of a stagnation point with respect to a reference point on the surface of the airfoil based upon the signals and the location details; and
  - determining an angle of attack (AOA) on the surface of the airfoil based upon the location of the stagnation point and the transfer function, wherein the transfer function defines a relationship between the angle of attack and the location of the stagnation point with respect to the reference point.

2. The wind turbine of claim 1, wherein the sensing device comprises a capacitance based membrane pressure strip, a resistance based membrane pressure strip, a resistance sensor, a capacitance sensor, and combinations thereof.

3. The wind turbine of claim 1, wherein the sensing device comprises a thickness of less than 6 millimeters.

4. The wind turbine of claim 1, wherein a first predefined length of the sensing device is disposed on a pressure side and a second predefined length of the sensing device is disposed on a suction side, and the sensing device extends from a leading edge towards a trailing edge.

5. The wind turbine of claim 4, wherein the first predefined length is 80% of the sensing device and the second predefined length is 20% of the sensing device.

6. The wind turbine of claim 1, wherein the sensing device is disposed on the pressure side and extends from the leading edge along a third predefined length of a chord of the airfoil.

7. The wind turbine of claim 6, wherein the third predefined length is 30% of the length of the chord.

8. The wind turbine of claim 1, wherein the airfoil further comprises a sleeve to preserve an aerodynamic performance of the airfoil.

9. The wind turbine of claim 8, wherein the sleeve extends from an end to another end of the sensing device such that a location of the sensing device does not overlap with a location of the sleeve.

10. The wind turbine of claim 8, wherein a thickness of the sleeve is similar to a thickness of the sensing device.

11. The wind turbine of claim 1, wherein one or both ends of the sensing device are tapered.

12. The wind turbine of claim 1, wherein the processing subsystem further comprises computer executable instructions to execute the step of optimizing aerodynamics of the blade based upon the AOA.

13. The wind turbine of claim 1, wherein the processing subsystem further comprises computer executable instructions to execute the step of determining an optimized angle of attack (AOA) at the surface of the airfoil based upon the determined AOA.

14. The wind turbine of claim 1, further comprising a data repository that stores the location details, the transfer function, the location of stagnation point, intermediate results, one or more coefficients of the transfer function, and combinations thereof.

15. A wind turbine system, comprising:
- a plurality of blades, wherein each of the plurality of blades comprises a plurality of airfoils;
- a sensing device disposed on each of the plurality of airfoils, wherein the sensing device generates signals that are representative of pressure deflection on a corresponding surface of each of the plurality of airfoils;
- a processing subsystem comprising computer executable instructions configured to execute the steps of:
  - receiving location details of the sensing device and a transfer function corresponding to each of the plurality of airfoils;
  - determining a location of a stagnation point, with respect to a reference point, on the corresponding surface of each of the plurality of airfoils based upon the signals and the location details; and
  - determining an angle of attack (AOA) on the corresponding surface of each of the plurality of airfoils based upon the stagnation point and the transfer function, wherein the transfer function defines a relationship between the angle of attack and the location of the stagnation point with respect to the reference point.

16. A method for determining an angle of attack (AOA) on a surface of an airfoil of a blade, comprising:
- generating signals that are representative of pressure deflection on the surface of the airfoil;
- receiving location details of the sensing device and a transfer function corresponding to the airfoil;
- determining a location of a stagnation point, with respect to a reference point, on the surface of the airfoil based upon the signals and the location details;
- determining an angle of attack (AOA) on the surface of the airfoil based upon the location of the stagnation point and the transfer function, wherein the transfer function defines a relationship between the angle of attack and the location of the stagnation point with respect to the reference point; and
- adjusting a pitch angle of the blade based on the AOA.

* * * * *